US005862061A

United States Patent [19]
Yamashita et al.

[11] Patent Number: 5,862,061
[45] Date of Patent: Jan. 19, 1999

[54] SCINTILLATION CAMERA USING A PHOTOMULTIPLIER HAVING A PLURALITY OF ANODES

[75] Inventors: Takaji Yamashita; Tomohide Omura, both of Hamamatsu, Japan

[73] Assignee: Hamamatsu Photonics K.K., Hamamatsu, Japan

[21] Appl. No.: 427,594

[22] Filed: Apr. 24, 1995

[30] Foreign Application Priority Data

Apr. 25, 1994 [JP] Japan ................................ 6-086724

[51] Int. Cl.⁶ .......................... G01T 1/208; G01T 1/20; G01B 11/00
[52] U.S. Cl. ........................... 364/559; 250/366
[58] Field of Search ................. 250/366, 368, 250/369; 364/559

[56] References Cited

U.S. PATENT DOCUMENTS

| | | | |
|---|---|---|---|
| 3,609,750 | 9/1971 | Budd et al. | 345/215 |
| 3,935,461 | 1/1976 | Vlasboem | 250/368 |
| 3,937,964 | 2/1976 | Muehllehner | 250/366 |
| 4,042,756 | 8/1977 | Goebel et al. | 429/94 |
| 4,074,135 | 2/1978 | Stevens | 250/366 |
| 4,195,931 | 4/1980 | Hara | 356/346 |
| 4,228,515 | 10/1980 | Genna et al. | 364/571 |
| 4,274,002 | 6/1981 | Tomita | 250/366 |
| 4,503,382 | 3/1985 | Zehl et al. | 324/76.37 |
| 4,633,066 | 12/1986 | Chang | 219/437 |
| 4,661,909 | 4/1987 | Kumazawa et al. | 364/571 |
| 4,728,846 | 3/1988 | Yasuda | 313/451 |
| 4,882,495 | 11/1989 | Tanaka | 250/363.09 |
| 5,105,773 | 4/1992 | Cunningham et al. | 123/3 |
| 5,268,955 | 12/1993 | Burke et al. | 378/135 |
| 5,347,126 | 9/1994 | Krauss et al. | 250/309 |
| 5,507,932 | 4/1996 | Robinson | 204/228 |

FOREIGN PATENT DOCUMENTS 387 800   9/1990   European Pat. Off. .

OTHER PUBLICATIONS

Tanaka et al, "Scintillation Cameras Based on New Position Arithmetics", Journal of Nuclear Medicine, Sep. 1970, vol. 11, No. 9, pp. 542–547.
Genna et al, "Digital Scintigraphy: Concepts and Designs", IEEE Transactions on Nuclear Science, vol. NS–29, No. 1, Feb. 1982, pp. 558–562.
Milster et al, "Digital Position Estimation for the Modular Scintillation Camera", IEEE Transactions on Nuclear Science, vol. NS–32, No. 1, Feb. 1985, pp. 748–752.
Clinthorne et al, "A Hybrid Maximum Likelihood Position Computer for Scintillation Cameras", IEEE Transactions on Nuclear Science, vol. NS–34, No. 1, Feb. 1987, pp. 97–101.
Patent Abstracts of Japan, unexamined application, P field, vol. 16, No. 551, Nov. 20, 1992, The Patent Office Japanese Government, p. 119 P1453; & JP–A–04 208 894 (Toshiba).

*Primary Examiner*—Edward R. Cosimano
*Attorney, Agent, or Firm*—Cushman Darby & Cushman IP Group of Pillsbury Madison & Sutro, LLP

[57] ABSTRACT

A high resolution scintillation camera includes a scintillator which generates scintillation light having a light amount proportional to the energy value of incident radiation at the radiation incident position. The generated scintillation light is supplied to several of a plurality of photodetectors forming a detector array. These photodetectors output electrical signals proportional to the supplied light amounts, respectively. The output electrical signals are supplied to a selector to select a photodetector arranged at the radiation incident position and a plurality of photodetectors adjacent to this photodetector. A detection unit detects the radiation incident position on the scintillator on the basis of output signals from a plurality of segments of each photodetector selected by the selector.

17 Claims, 11 Drawing Sheets

Fig. I

SCINTILLATION CAMERA USING A PHOTOMULTIPLIER HAVING A PLURALITY OF ANODES

BACKGROUND OF THE INVENTION

1. Field of the Invention

The present invention relates to a scintillation camera for picking up a radioisotope (RI) distribution image in an object under test on an RI dosage.

2. Related Background Art

A scintillation camera for picking up an RI distribution image in an object under test is described in, e.g., U.S. Pat. No. 4,228,515. This apparatus measures the interaction position of radiation irradiated on a scintillator.

SUMMARY OF THE INVENTION

An apparatus according to the present invention measures a radiation incident position on a scintillator at a resolution higher than that of the above-described conventional apparatus. A photomultiplier of the present invention detects fluorescence (scintillation light) from the scintillator at a high resolution.

The resolving power of a scintillation camera is determined by the number of photoelectrons per event generated in each PMT and the spread of a light distribution function distributed on each PMT. As the spread of the light distribution function is reduced, the resolving power generally increases. However, there is a limit to reduce the spread of the light distribution function because of the geometrical size of the PMT. More specifically, light generated immediately above a PMT does not provide position information unless it is distributed to adjacent PMTs in addition to the PMT immediately below the light generation location. Therefore, the light distribution function must be controlled such that the light is incident on the adjacent PMTs. The light distribution function is controlled by adjusting the shape or thickness of a light guide or inserting a light-shielding mask between the light guide and the scintillator.

When an array is formed by using small PMTs, the resolving power increases as a matter of course. However, this results in an increase in the number of detectors or preprocessing circuits and makes the apparatus complex and bulky. It also causes an increase in cost (a two-dimensional array with a ½ size quadruples the number of PMTs).

It is an object of the present invention to provide a scintillation camera for solving the above problems and obtaining a higher resolving power (position resolution).

An apparatus according to the present invention has a detector array. The detector array has a plurality of photodetectors each having a plurality of anodes. The plurality of anodes are preferably concentrically arranged. The detector array is fixed to a holder.

According to the scintillation camera of the present invention, when radiation is incident on a scintillator, scintillation light having a light amount proportional to the energy of the radiation is generated at the radiation incident position. The generated scintillation light is supplied to some of a plurality of photodetectors forming a detector array. These photodetectors output electrical signals proportional to the supplied light amounts, respectively. The output electrical signals are supplied to a selector means to select a photodetector nearest to the radiation incident position on the scintillator and a plurality of photodetectors adjacent to this photodetector. A detector means detects the radiation incident position on the scintillator on the basis of output signals from a plurality of segments of each photodetector selected by the selector.

When the detector array formed of a plurality of detectors each having two segments, i.e., outer and inner segments which are concentrically arranged, is used, the selector and detector function as follows. The selector selects a first photodetector nearest to the radiation incident position on the scintillator and two photodetectors (second and third photodetectors) of a plurality of photodetectors adjacent to the first photodetector in an ascending order of linear distances to the incident position. The detector detects the radiation incident position on the scintillator on the basis of a total of four output signals, i.e., two output signals from the inner and outer segments of the first photodetector and two output signals from the outer and inner segments of the second and third photodetectors. To increase the detection precision, the radiation incident position on the scintillator may be detected on the basis of a total of six output signals from the outer and inner segments of the first to the third photodetectors.

As described above, the number of output signals supplied from the detector array to the detector limited, thereby simplifying the circuit structure of the detector.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

An embodiment of the present invention will be described below with reference to the accompanying drawings.

Figure 1:
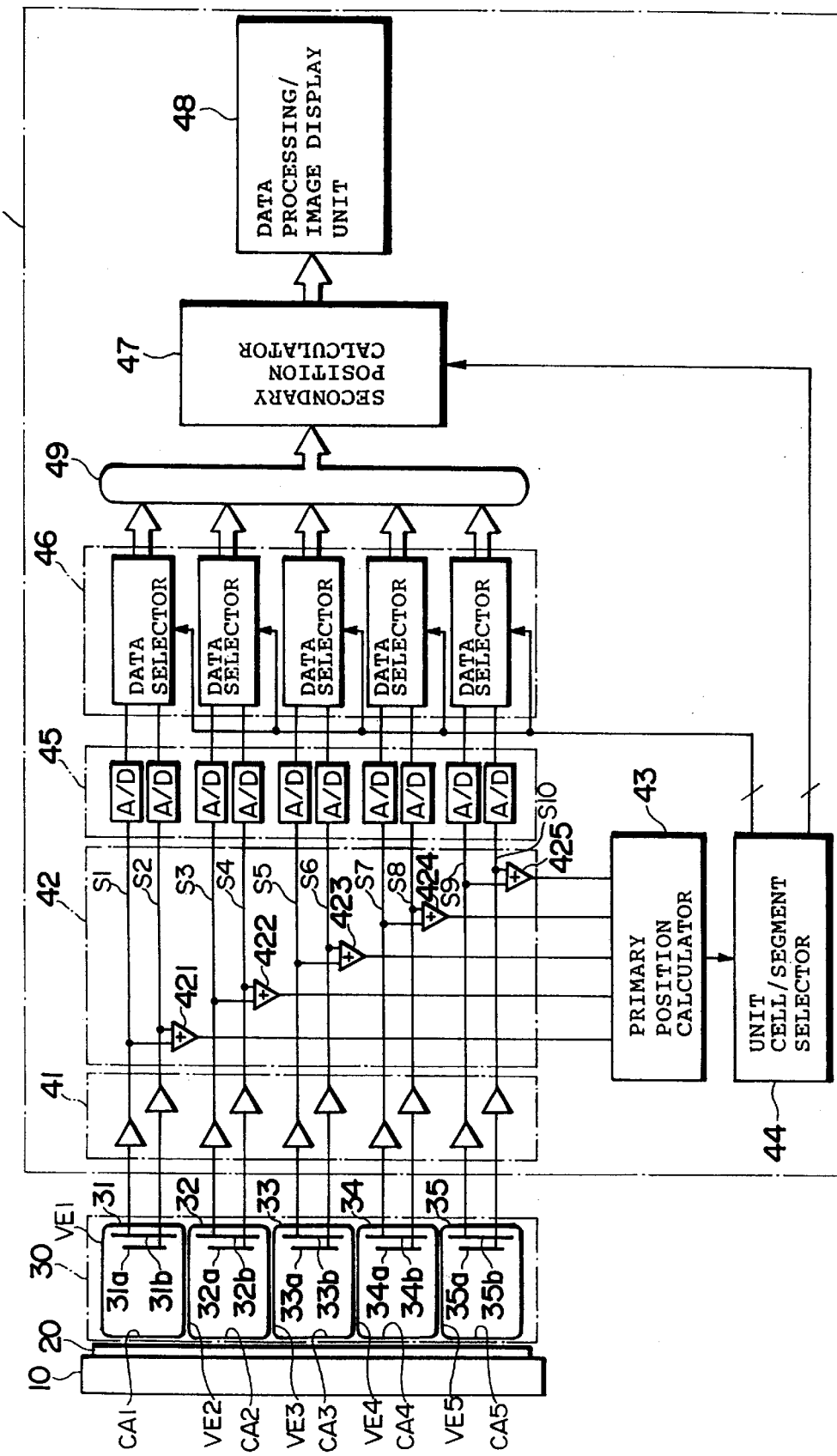
FIG. 1 is a block diagram showing the arrangement of a scintillation camera according to one embodiment of the present invention.

FIG. 1 is a block diagram showing the arrangement of a scintillation camera according to one embodiment of this invention. FIG. 1 shows the structure of a section (section including X-axis). A section perpendicular to this section (section including Y-axis) also has the same structure.

Figure 10:
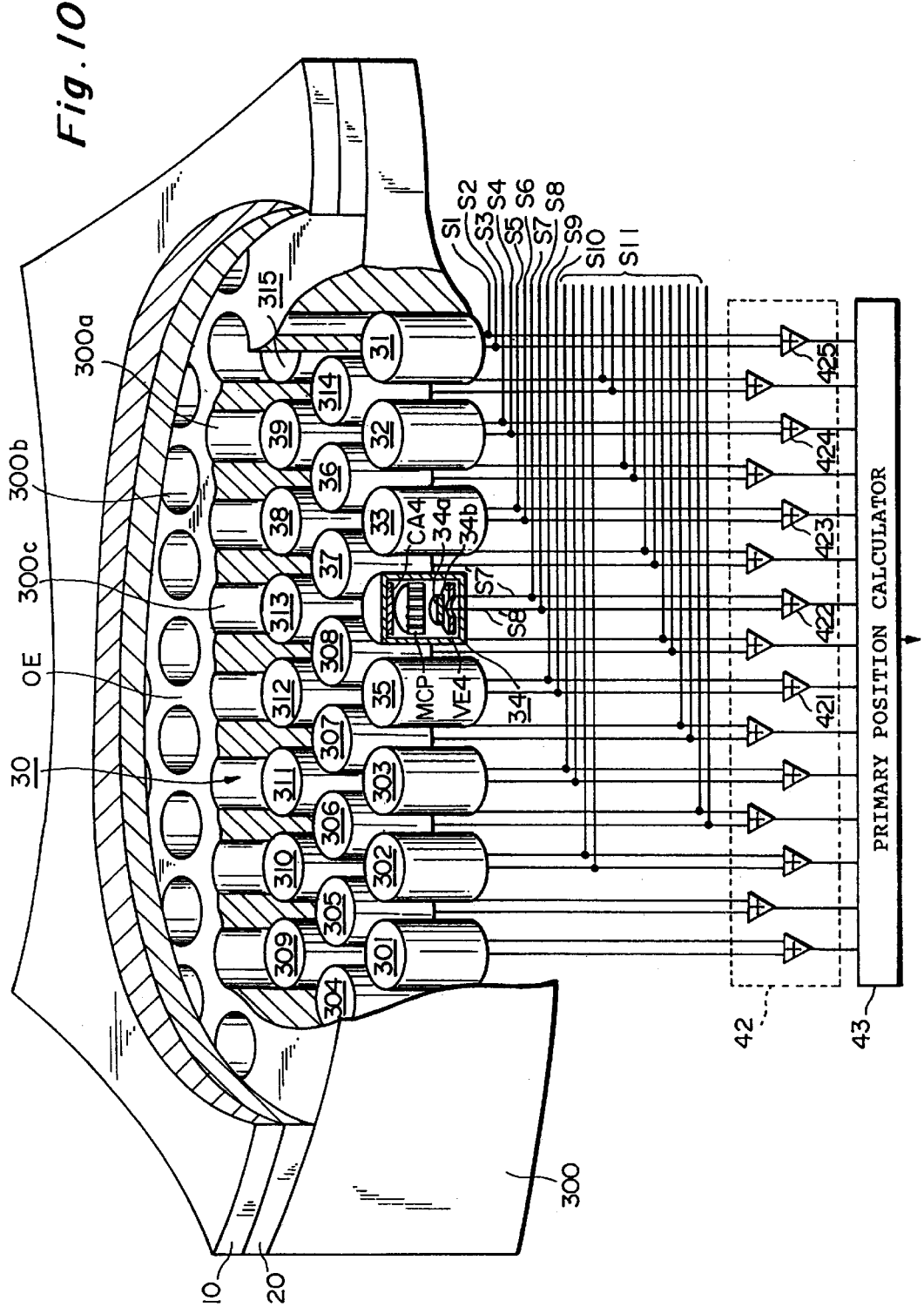
FIG. 10 is a view for explaining the photomultiplier of the apparatus shown in FIG. 1 in detail.

FIG. 10 shows the details of the apparatus shown in FIG. 1. The same reference numerals denote the same elements throughout the drawings. The apparatus shown in FIGS. 1 and 10 is an apparatus for detecting a radiation incident position.

This apparatus includes a curved member (holder) 300 having a plurality of fixing holes 300a to 300c, a light guide 20 arranged on the curved member 300, and a scintillator 10 arranged on the light guide 20.

The light guide 20 covers opening edges OE of the fixing holes 300a to 300c. The light guide 20 is in contact with the curved member 300 and fixed. FIG. 10 is a partially cutaway view of the apparatus to readily understand of the internal structure.

The scintillator 10 converts radiation incident thereon at a certain position into scintillation light.

A detector array 30 is arranged to oppose the scintillator 10. The detector array 30 has a plurality of photomultipliers 31 to 39 and 301 to 315 serving as photodetectors. These photodetectors are inserted in the fixing holes and fixed to the holder 300. For example, the photodetector 39 is inserted in the fixing hole 300a and fixed to the holder 300. All the photodetectors shown in FIG. 10 have the same structure, and only the photomultiplier 34 will be described below.

Figure 11:
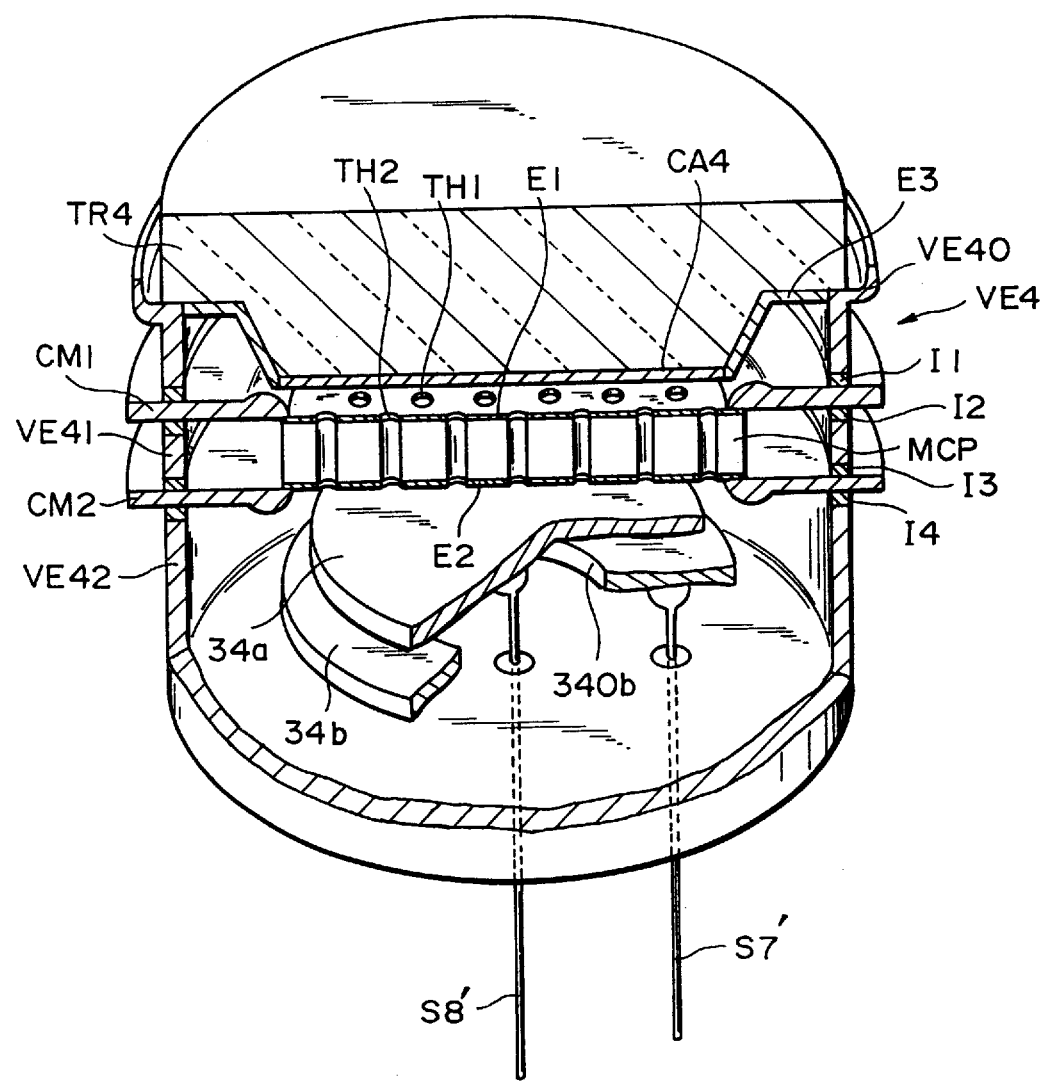
FIG. 11 is a partially cutaway view of the photomultiplier according to the embodiment.

FIG. 11 is a partially cutaway view of the photomultiplier 34. The photomultiplier 34 has an envelope VE4, a cathode CA4 arranged in the envelope VE4, a plurality of anodes 34a and 34b, and a microchannel plate MCP arranged between the anode 34a and the cathode CA4. The cathode CA4 is arranged to oppose the scintillator 10 in FIG. 10. Scintillation light incident on the cathode CA4 is converted into electrons. Electrons generated in the photocathode CA4 are multiplied by the microchannel plate MCP. Some of the multiplied electrons are collected by the anode 34a while other electrons are collected at the periphery of the anode 34b. The anodes 34a and 34b are concentrically arranged.

The envelope VE4 comprises cylinders VE40 and VE41, a bottomed cylinder VE42, and a transparent plate TR4 for sealing the envelope VE4. Conductive members CM1 and CM2 are respectively interposed between the cylinders VE40 and VE41 and between the cylinders VE41 and VE42, thereby fixing the microchannel plate MCP to the envelope VE4. The cylinders VE40 to VE42 and the conductive members CM1 and CM2 are insulated from each other by insulating members I1 to I4.

A predetermined potential is applied to electrodes E1 and E2 of the microchannel plate MCP through the conductive members CM1 and CM2. The conductive members sandwich the microchannel plate MCP. Accordingly, the microchannel plate MCP is supported by the conductive members CM1 and CM2, and fixed to the envelope VE4.

The microchannel plate MCP has a plurality of holes TH1 and TH2 and serves as an electron multiplier having a secondary electron emission material coated on the inner walls of these holes.

The photocathode CA4 is formed on the transparent plate TR4. A predetermined potential is applied to the photocathode CA4 through a Cr electrode layer E3 and the cylinder VE40 formed of a conductive material.

The inner anode 34a has a circular shape. The outer anode 34b has an annular shape. A pin S8' is connected to the inner anode 34a. The outer anode 34b has a through hole 340b. The pin S8' extends outward from the inside of the envelope VE4 through the through hole 340b of the outer anode 34b. A pin S7' is connected to the outer anode 34b. The pin S7' extends outward from the inside of the envelope VE4. The through hole 340b has a diameter smaller than that of the inner anode 34a. Accordingly, the multiplied electrons not collected by the inner electrode 34a do not pass through the through hole 340b and are almost entirely collected by the outer electrode 34b.

Figure 2:
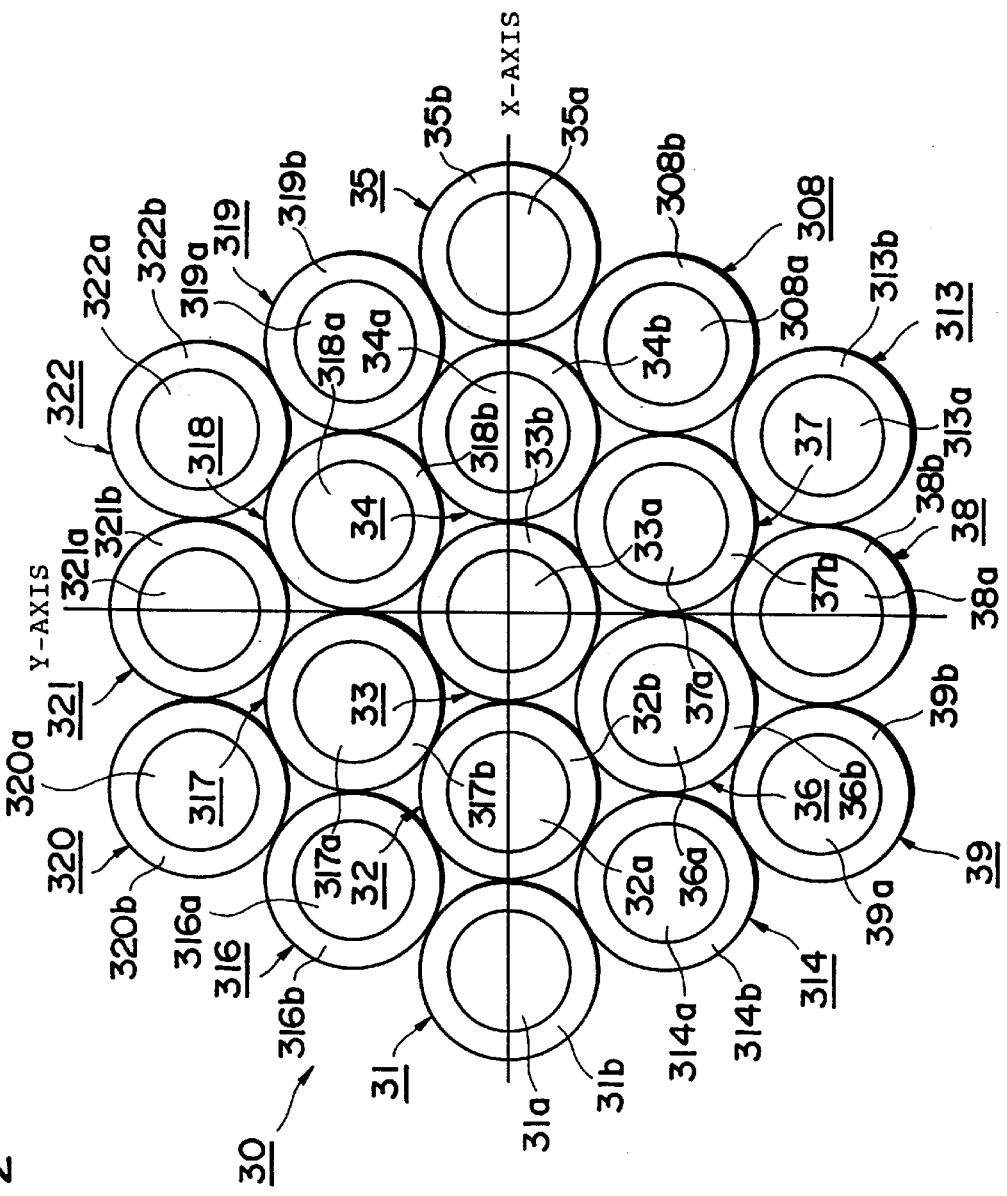
FIG. 2 is a plan view showing the structure of a PMT array.

FIG. 2 is a view for explaining the arrangement of the detector array 30 shown in FIG. 10 on the X-Y coordinate system.

The detector array 30 has a plurality of photodetector cells (including a first photodetector cell including of the photodetectors 36 to 38 and a second photodetector cell consisting of the photodetectors 34, 35, and 308). The photodetectors 31 to 33, 35 to 39, and 301 to 315 have the same structure as the photodetector 34. Therefore, the first photodetector cell has the photodetectors 36 to 38. Each photodetector, e.g., the photodetector 36 has at least a pair of anodes 36a and 36b. The photodetectors 36 to 38 forming the first photodetector cell are adjacent to each other.

The photodetectors 31 to 33, 35 to 39, and 301 to 315 have the same structure as in the photodetector 34. Therefore, each photodetector has a cathode arranged to oppose the scintillator in its envelope. The cathode converts scintillation light incident thereon into electrons. The anodes of each photodetector collect some of electrons generated in the cathode of the photodetector.

As shown in FIGS. 10 and 11, the photodetector 34 has the photocathode CA4 in the envelope. Electrons generated in the photocathode CA4 are collected by the anodes 34a and 34b. A charge collected by the anode 34a is introduced in a signal line S8 through the pin S8' while a charge collected by the anode 34b is introduced in a signal line S7 through the pin S7'.

Similarly, the photodetector 31 has a photocathode CA1 in its envelope VE1. Electrons generated in the photocathode CA1 are collected by anodes 31a and 31b (see FIG. 1).

The photodetector 32 has a photocathode CA2 in its envelope VE2. Electrons generated in the photocathode CA2 are collected by anodes 32a and 32b.

The photodetector 33 has a photocathode CA3 in its envelope VE3. Electrons generated in the photocathode CA3 are collected by anodes 33a and 33b.

The photodetector 35 has a photocathode CA5 in its envelope. Electrons generated in the photocathode CA5 are collected by anodes 35a and 35b.

Signal lines S1 to S10 are connected to these photodetectors. The signal lines S1 to S10 are shown in FIG. 1. A signal line group S11 is connected to the remaining photodetectors shown in FIG. 10, as in FIG. 1.

Detection of a radiation incident position will be described below.

The scintillation camera of the embodiment shown in FIG. 1 includes the scintillator 10 for generating scintillation light upon incidence of radiation including a γ-ray, the light guide 20 for distributing the scintillation light generated in the scintillator 10 at an appropriate ratio, the PMT array 30 for converting the scintillation light distributed through the light guide 20 into an electrical signal proportional to the incident light amount, and a position detector 40 for detecting a scintillation light emission position on the basis of an output from the PMT array 30.

The position detector 40 includes a preamplifier group 41 for performing amplification and impedance conversion of segment outputs from the PMTs 31 to 35, an adder group 42 for adding outputs from the preamplifier group 41 in units of PMTs 31 to 35, and a primary position calculator 43 for calculating a scintillation position from outputs from the adder group 42.

The adder group 42 has a plurality of adders 421 to 425. The position detector 40 also includes a unit cell/segment selector 44 for specifying a unit cell and a segment, which belong to the scintillation position, from the calculation result from the primary calculator 43, an A/D converter group 45 for converting analog signals as outputs from the preamplifier group 41 into digital signals, and data selectors 46 for selecting A/D conversion outputs on the basis of a segment selection signal from the unit cell/segment selector 44.

The system 40 also has a secondary position calculator 47 for calculating the scintillation position from the A/D conversion outputs selected by the data selectors 46, and a data processing/image display unit 48 for displaying the calculation result from the secondary position calculator 47.

As shown in FIG. 2, the PMT array 30 has a structure in which nineteen PMTs 31 to 39, 308, 313, 314, and 316 to 322 are arranged to form a hexagonal light-receiving plane (X-Y plane). The PMT 34 has an anode formed by the inner segment (anode) 34a and the outer segment (anode) 34b. The photomultipliers 31 to 33, 35 to 39, and 301 to 322 shown in FIG. 10 or 2 have the same structure as in the photomultiplier 34 and respectively has inner anodes 31a to 33a, 35a to 39a, and 301a to 322a, and outer anodes 31b to 33b, 35b to 39b, and 301b to 322b.

As described above, when the anode is divided into two segments (the inner and outer segments 31a and 31b) to independently extract an output from each segment, a higher resolving power than that of a conventional PMT array (anodes are not divided) will be obtained.

Figure 3A:
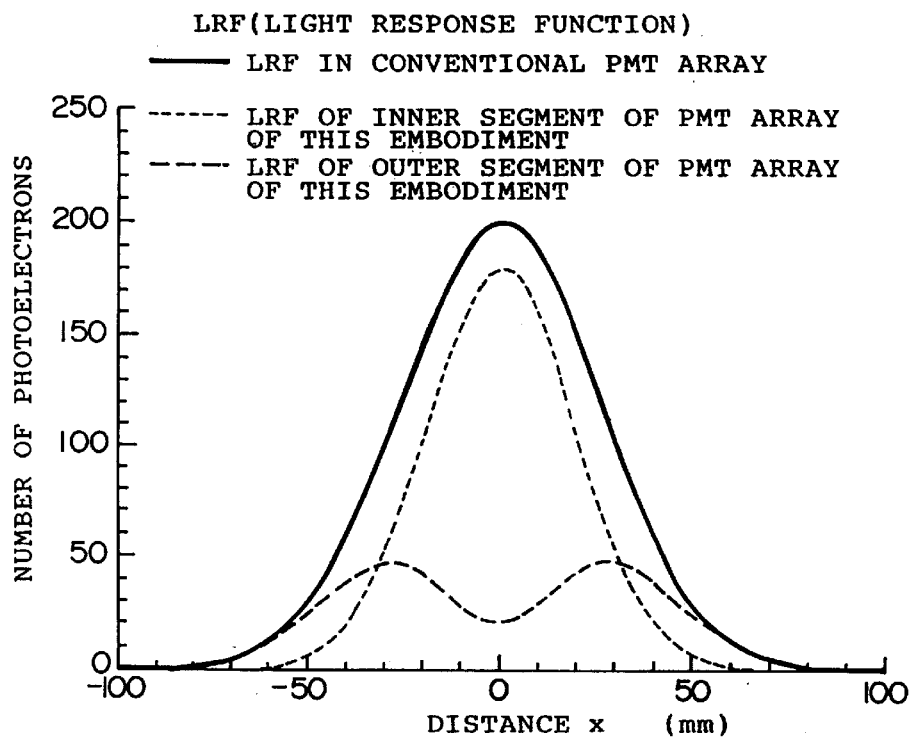
FIGS. 3A and 3B are graphs showing the difference in resolving power characteristics between a conventional PMT array and the PMT array of the embodiment shown in FIG. 1.
Figure 3B:
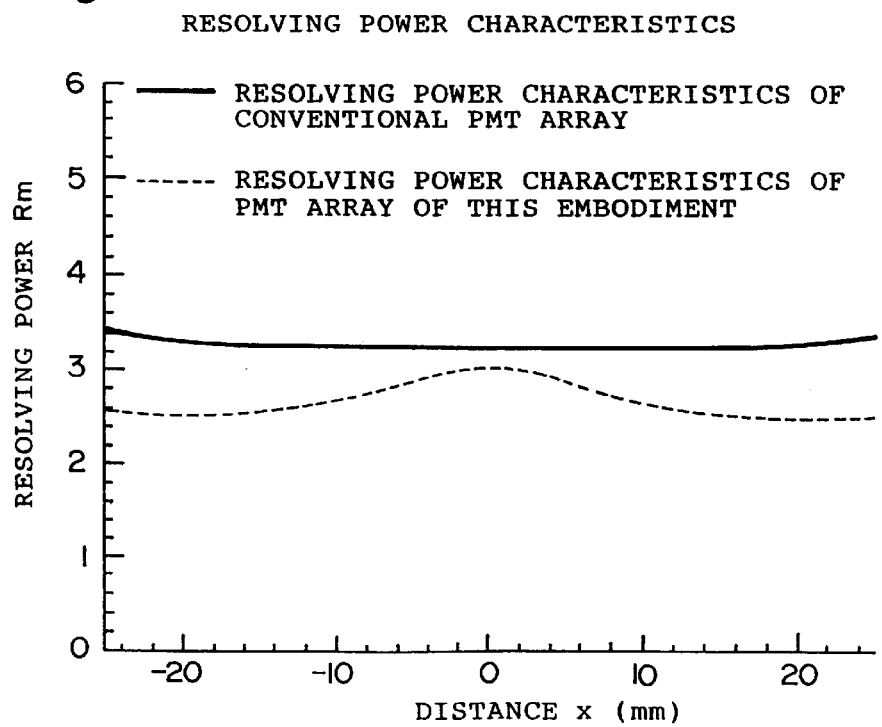

FIGS. 3A and 3B are graphs showing the comparison in resolving power between the conventional PMT array with undivided anodes and the PMT array 30 of this embodiment. FIG. 3A is a graph showing a change in output with respect to the scintillation light emission position (light response function: to be referred to as an LRF hereinafter) of the conventional PMT array and the LRFs of the inner and outer segments of this embodiment. A distance x from the scintillation light emission position is plotted along the abscissa, and the number of photoelectrons is plotted along the ordinate. Substitutions of these LRFs in the following equation can yield the resolving powers (position resolutions) of the conventional PMT array and the PMT array 30 of this embodiment:

$$R_m = 1 / \sqrt{\sum_i \frac{(dn_i/dx)^2}{n_i}}$$

Where $n_i$ is the LRF of an ith segment (or PMT). It is apparent from the above equation that a large inclination of the LRF at each position is an important factor for improving the resolving power.

FIG. 3B is a graph showing the result obtained when the resolving power characteristics of the conventional PMT array and the PMT array 30 of this embodiment are calculated by using the above equation. The distance x from the scintillation position is plotted along the abscissa, and a resolving power Rm is plotted along the ordinate. It is apparent from this graph that the PMT array 30 of this embodiment has a resolving power higher than that of the conventional PMT array. Particularly, the resolving power is excellent at a position away from the scintillation position.

Figure 4:
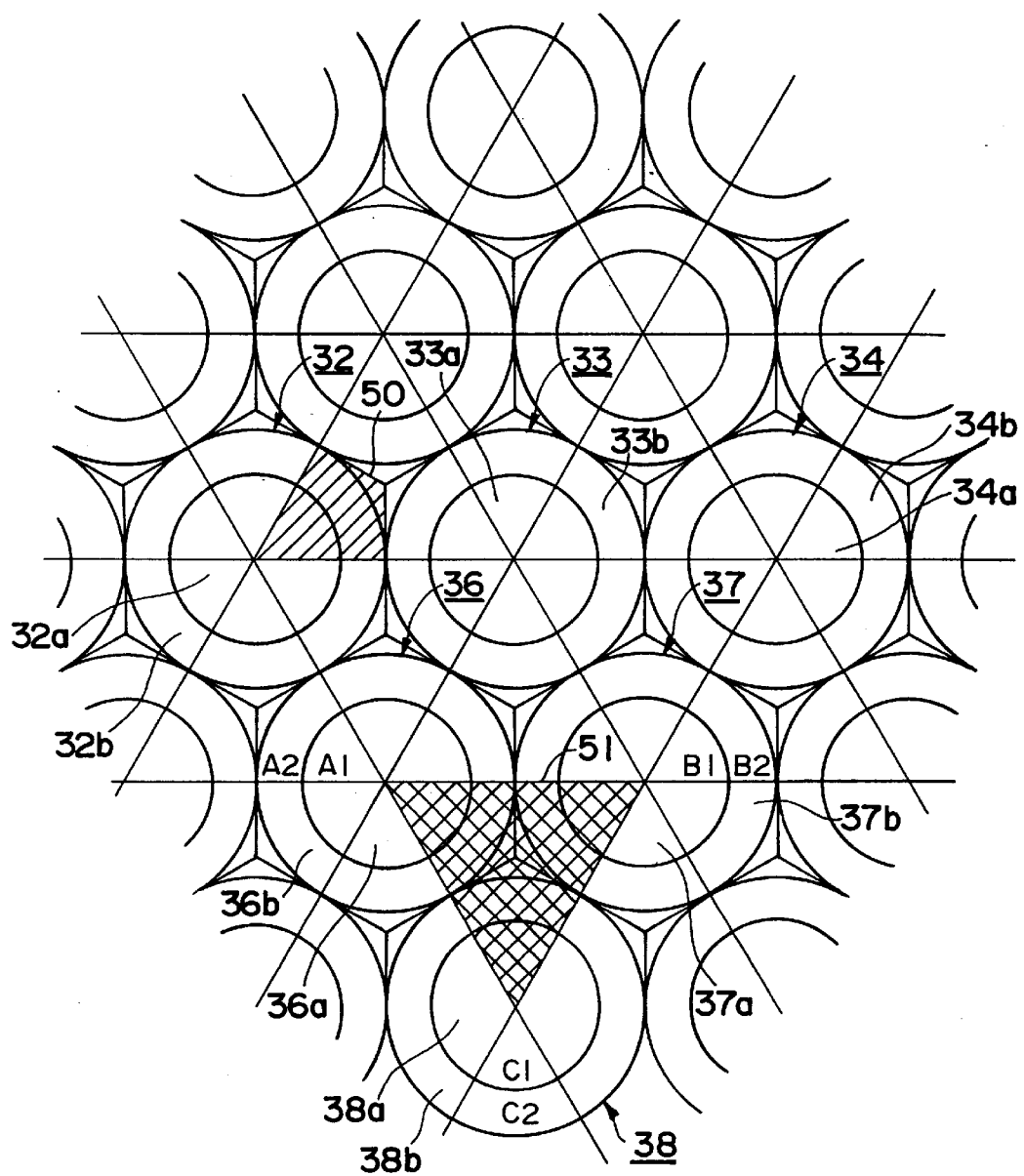
FIG. 4 is a view showing the relationship between the PMT array and a basic cell.

As shown in FIG. 4, a unit cell 50 specified by the unit cell/segment selector 44 corresponds to an area obtained upon equally dividing a regular triangle having its vertices at the centers of the PMTs into three areas. In this embodiment, the primary position calculator 43 detects a unit cell where scintillation light emission has occurred, and the secondary position calculator 47 calculates a detailed scintillation light emission position on the basis of the calculation result from the primary position calculator 43. The basic cell is used for the rough position calculation by the primary position calculator 43. The secondary position calculator 47 calculates an accurate position on the basis of output signals from four segments overlapping the basic cell or adjacent to the basic cell specified by the primary position calculator 43. Such a method in which a light emission position is specified by the two-step calculation is disclosed in, e.g., Japanese Patent Laid Open No. 4-208894.

The operation of the scintillation camera of this embodiment having the above structure will be described below. When a γ-ray radiated from an object under test on the dosage of a radioisotope is incident on the scintillator 10 in FIG. 1, scintillation light is generated at the γ-ray incident position. This scintillation light is spread through the light guide 20 and distributed onto the predetermined PMTs 31 to 35 of the PMT array 30 at an appropriate ratio. In each of the PMTs 31 to 35, the distributed scintillation light is converted to an electrical signal proportional to the intensity of the incident light. Outputs from the inner and outer segments of the PMTs 31 to 35 are independently extracted and subjected to amplification and impedance conversion in the preamplifiers 41.

Outputs from the preamplifiers 41 are branched into two signal systems. Preamplifier outputs of one signal system are added in the adders 42 in units of PMTs 31 to 35 and supplied to the primary position calculator 43. Preamplifier outputs of the other signal system are independently supplied to the A/D converters 45 in units of segment outputs, converted into digital signals according to the pulse height, and supplied to the data selectors 46. Although not illustrated, an integrator and a hold circuit for holding the pulse height integrated by this integrator are arranged between the preamplifiers 41 and the A/D converters 45.

Figure 5:
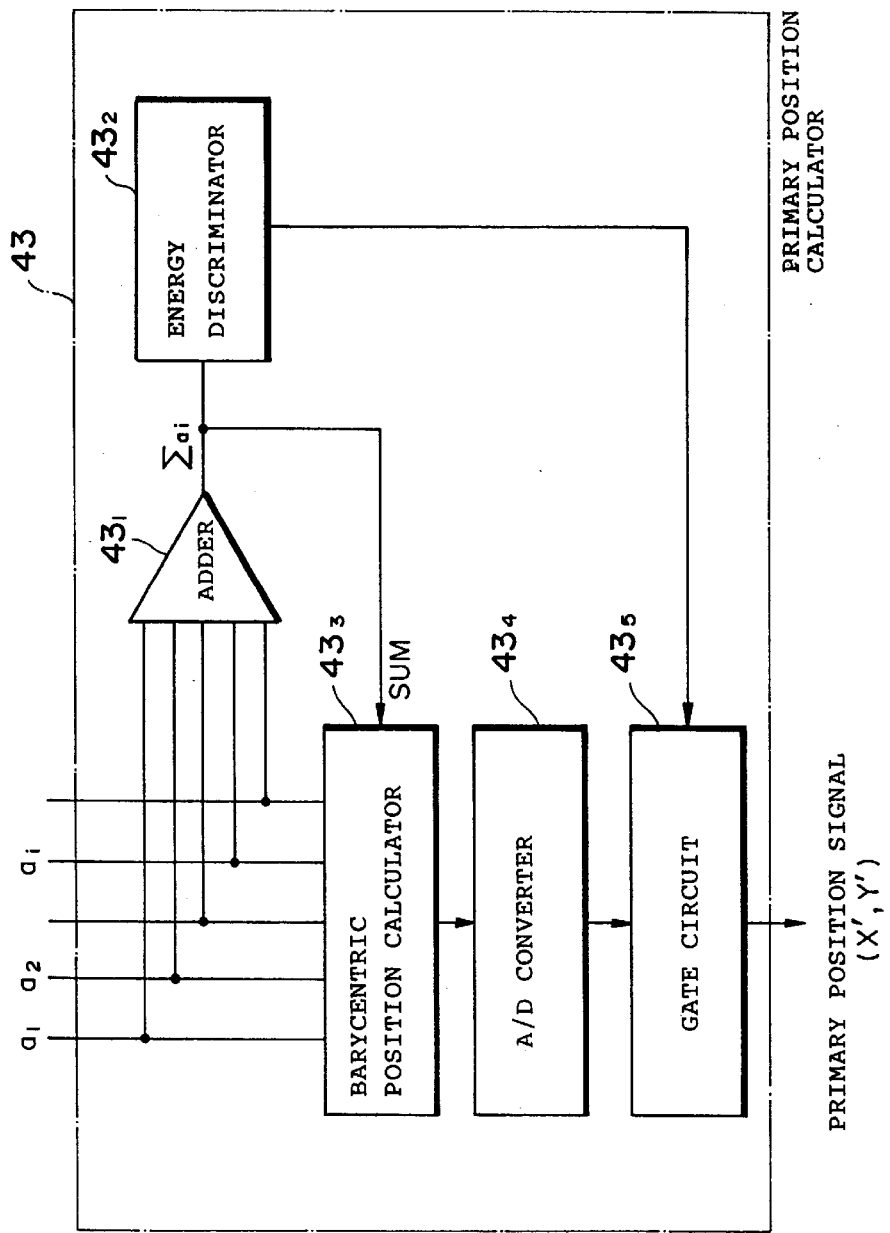
FIG. 5 is a block diagram showing the arrangement of a primary calculator.

Rough information associated with the scintillation position is obtained from the calculation result from the primary position calculator 43. FIG. 5 is a block diagram showing the arrangement of the primary position calculator 43. In this embodiment, a structure using a centroid calculation method is shown. A signal group ($a_1, a_2, \ldots, a_i, \ldots$) from the PMTs 31 to 35 is divided into two groups. One signal group is supplied to an adder 43$_1$ to calculate the sum of all the outputs. An output value ($\Sigma a_i$) from the adder 43$_1$ is supplied to an energy discriminator 43$_2$ and subjected to energy discrimination. Noise components are removed by this energy discrimination.

The other signal group ($a_1, a_2, \ldots, a_i, \ldots$) is supplied to a centroid position calculator 43$_3$. A conventional centroid calculation method can be applied to the centroid position calculator 43$_3$. More specifically, when the PMT output signals are defined as ($a_1, a_2, \ldots, a_i, \ldots$), and the position coordinates of each PMT are defined as ($X_i, Y_i$), the position coordinates (X,Y) of a light emission point can be calculated from the following equations:

$$X = \Sigma X_i \cdot a_i / \Sigma a_i, \quad Y = \Sigma Y_i \cdot a_i / \Sigma a_i$$

Figure 6:
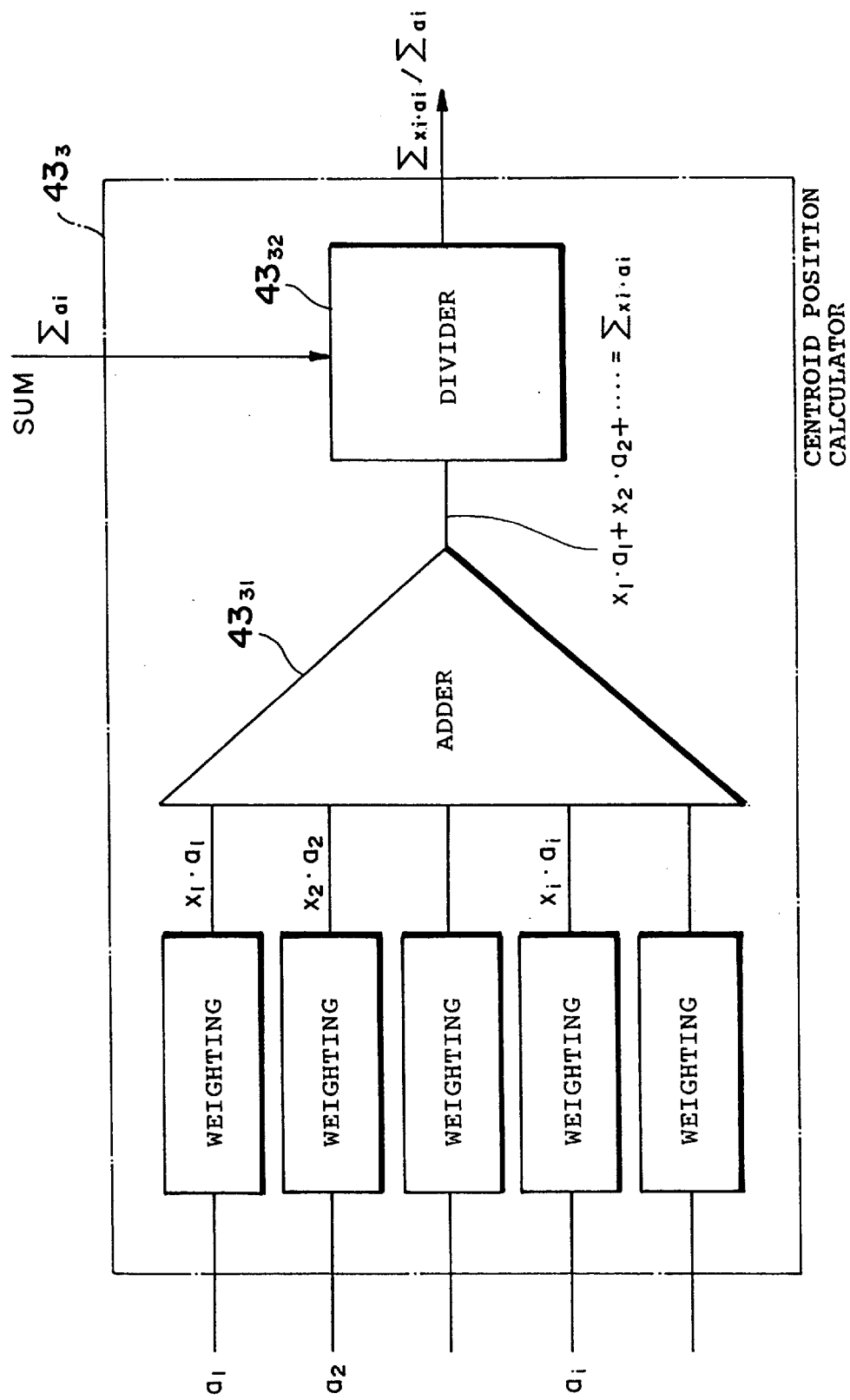
FIG. 6 is a block diagram showing the arrangement of a centroid position calculator.

FIG. 6 is a block diagram showing the arrangement of the centroid position calculator $43_3$. In the centroid position calculator $43_3$, the supplied signal group ($a_1, a_2, \ldots, a_i, \ldots$) is weighted (weighing is performed using values ($x_1, x_2, \ldots, x_i, \ldots$) proportional to the positions of the PMTs 31 to 35). The weighted signals ($x_1 \cdot a_1, x_2 \cdot a_2, \ldots, x_i \cdot a_i, \ldots$) are added by an adder $43_{31}$, and the weighted sum result ($\Sigma x_i \cdot a_i$) is supplied to a divider $43_{32}$. The sum value ($\Sigma a_i$) from the adder $43_1$ is also supplied to the divider $43_{32}$. The weighted sum value ($\Sigma x_i \cdot a_i$) is divided by the sum value ($\Sigma a_i$) to obtain a centroid position. The centroid position information obtained in this manner is supplied to an A/D converter $43_4$ in FIG. 5 and converted into digital signals. An output from the energy discriminator $43_2$ is supplied to a gate circuit $43_5$. Of digital signals obtained upon conversion in the A/D converter $43_4$, a digital signal corresponding to a centroid position based on the output signal group from the PMTs 31 to 35, which has a predetermined energy or more, is output as a primary position signal (X',Y').

Figure 7:
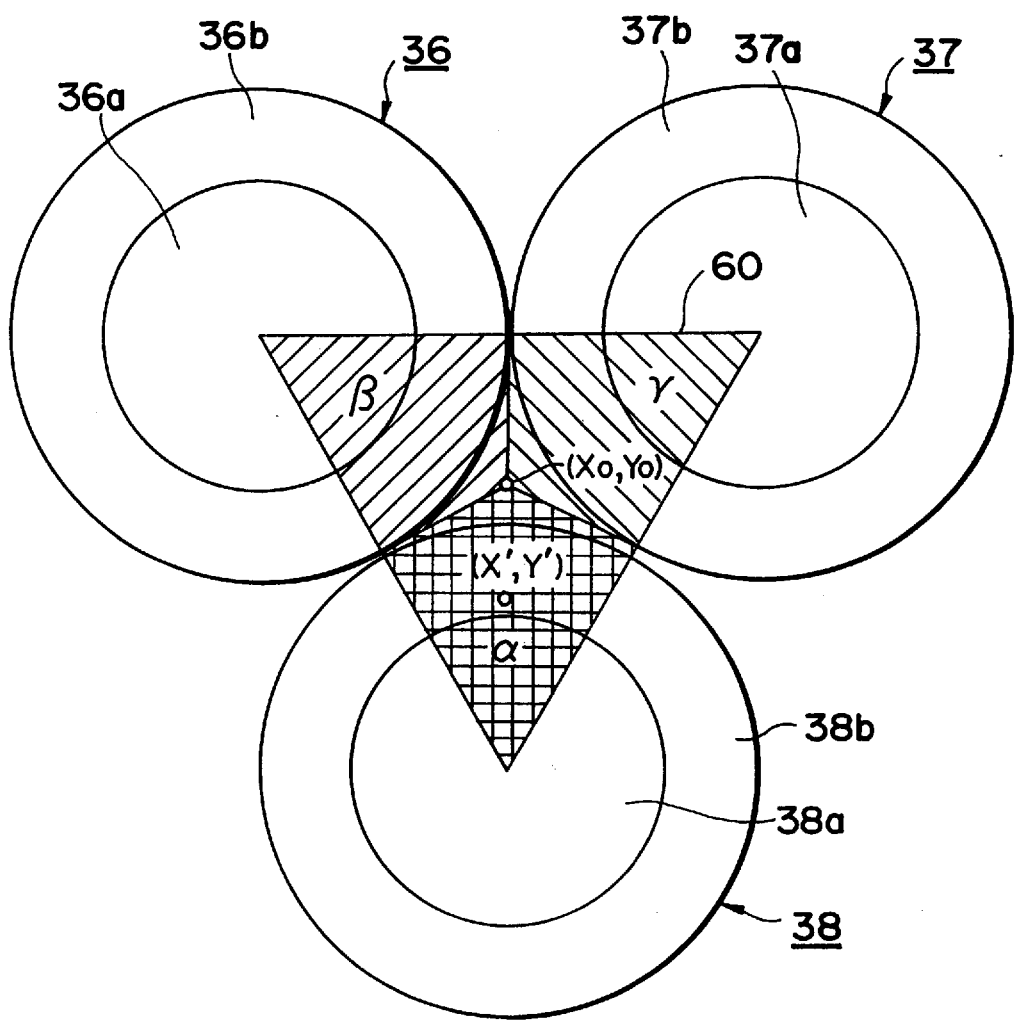
FIG. 7 is a view showing the types of basic cells.
Figure 8A:
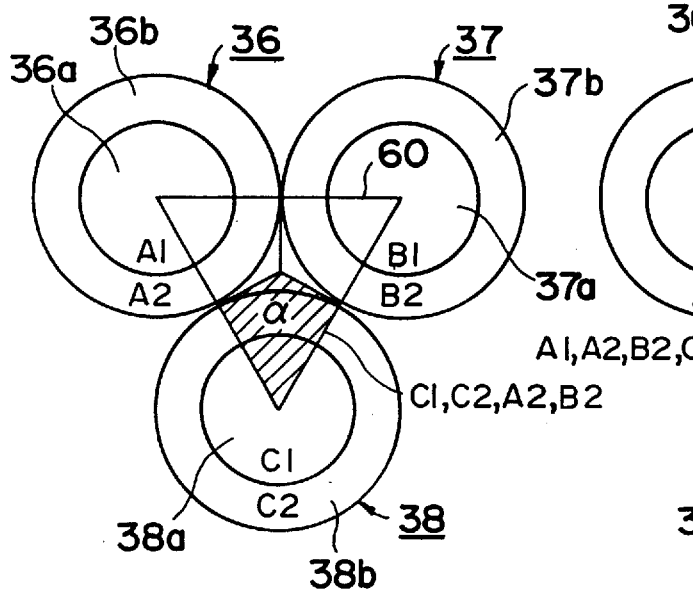
FIGS. 8A to 8C are views showing the relationship between the basic cell and a to-be-selected segment.
Figure 8B:
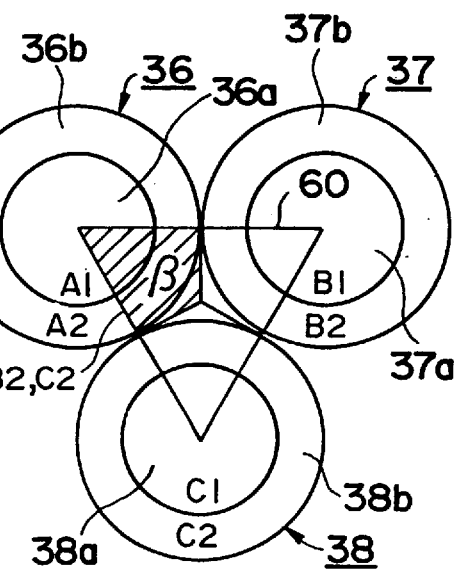
Figure 8C:
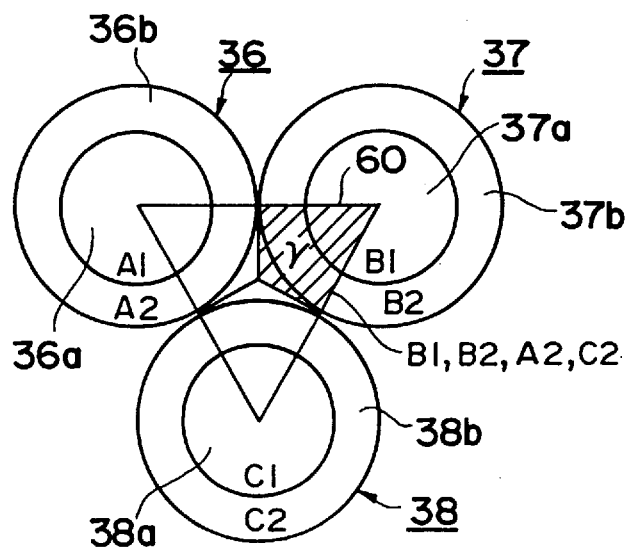

The primary position signal (X',Y') representing rough position information is supplied to the unit cell/segment selector 44 in FIG. 1, thereby obtaining a signal representing a central coordinate ($X_0, Y_0$) of a regular triangle 60 including a unit cell to which the primary position signal (X',Y') belongs, a signal representing the type ($\alpha$, $\beta$, or $\gamma$) of the unit cell, and a segment selection signal for selecting four segment outputs, as shown in FIG. 7. The types ($\alpha$, $\beta$, and $\gamma$) of unit cells are classified in accordance with the specific positions of areas which belong to the regular triangle 60. The segment selection signal selects outputs from segments C1 and C2 of the PMT 38 overlapping the basic cell ($\alpha$), and outputs from a segment A2 of the PMT 36 and a segment B2 of the PMT 37, which are adjacent to the basic cell ($\alpha$), as shown in FIG. 8A. Similarly, as for the basic cell ($\beta$) shown in FIG. 8B, outputs from segments A1, A2, B2, and C2 are selected. As for the basic cell ($\gamma$) shown in FIG. 8C, outputs from the segment B1, B2, A2, and C2 are selected. By selecting a limited number of PMT outputs, the number of signals used for position calculation in the secondary position calculator 47 can be decreased, resulting in a simple circuit arrangement.

Another method of selecting a basic cell is also available. For example, an area of a regular triangle having vertices at the centers of the three adjacent PMTs 36 to 38 may be defined as a basic cell 51, as shown in FIG. 4. In this case, six outputs from the segments A1, A2, B1, B2, C1, and C2 are supplied to the secondary position calculator 47 as PMT outputs. As compared to the method using the basic cell 50, the number of signals increases by two. Accordingly, the circuit arrangement of the secondary position calculator 47 becomes complex.

The segment selection signal output from the unit cell/segment selector 44 in FIG. 1 is supplied to the data selectors 46. Of the segment output signals converted by the A/D converters 45, output signals from four segments near the scintillation light emission point are selected. The four segment output signals selected by the data selectors 46 are supplied to the secondary position calculator 47 through a data bus 49. The unit cell type ($\alpha$, $\beta$, or $\gamma$) signal and the unit cell position coordinate ($X_0, Y_0$) signal, which are output from the unit cell/segment selector 44, are also supplied to the secondary position calculator 47.

Figure 9:
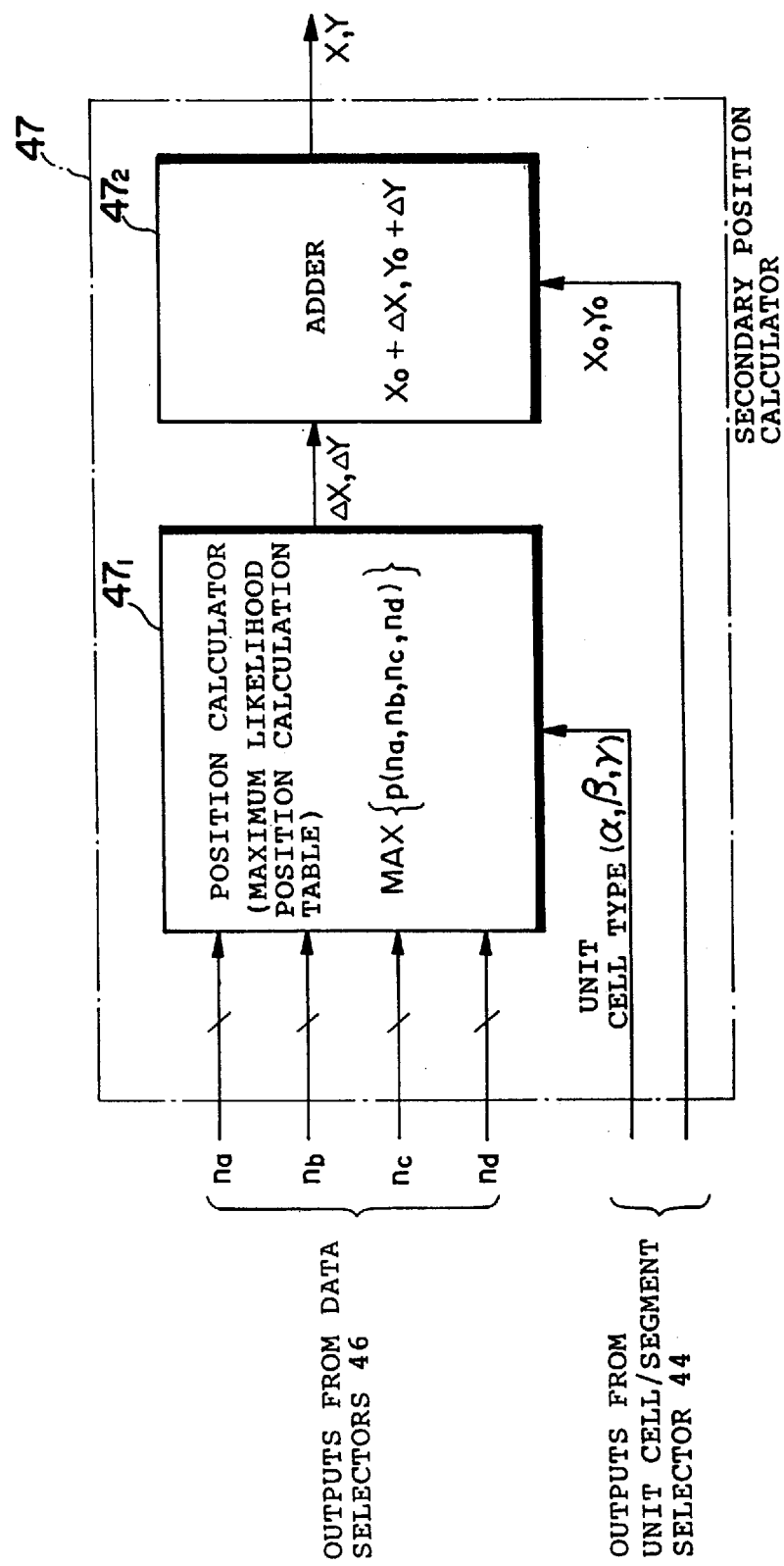
FIG. 9 is a block diagram showing the arrangement of a secondary position calculator.

FIG. 9 is a block diagram showing the arrangement of the secondary position calculator 47. Four segment selection output signals ($n_a, n_b, n_c$, and $n_d$) selected by the data selectors 46 are supplied to a position calculator $47_1$. From these signals and the unit cell type ($\alpha$, $\beta$, or $\gamma$) signal, a relative position signal ($\Delta X, \Delta Y$) corresponding to the unit cell coordinate in the unit cell is outputted. The position calculator $47_1$ has a table for giving a maximum likelihood position estimation value with respect to all the input values. A position calculation method using this table will be described later. The output ($\Delta X, \Delta Y$) from the position calculator $47_1$ and the unit cell position coordinates ($X_0, Y_0$) are supplied to an adder $47_2$, and a signal representing the position coordinates (X,Y) is output as a sum result.

The secondary position calculator 47 can be formed by a circuit using a random access memory (RAM) or an read-only memory (ROM). Data may be directly input to a high-speed computer, thereby performing position calculation by the CPU operation.

The calculated position coordinate (X,Y) signal is supplied to the data processing/image display unit 48 in FIG. 1 and accumulated in a two-dimensional position histogram memory, thereby performing data processing and image display.

As the position calculation method of the secondary position calculator 47, an example using the maximum likelihood method will be described below. Assume that the PMT outputs are defined as $N_1=n_1\mu$, $N_2=n_2\mu$, $N_3=n_3\mu$, ..., where $n_1, n_2, n_3, \ldots$ are the numbers of photoelectrons corresponding to the respective PMT outputs, and $\mu$ is an electron multiplication factor.

Functions (LRF: Light Response Function) representing a change in PMT output with respect to the light emission point (X,Y) are defined as $f_1(x,y)$, $f_2(x,y)$, $f_3(x,y)$, .... These LRFs can be obtained from calculations or actual measurements. At this time, a probability $p(n_1, n_2, n_3, \ldots)$ that the PMT outputs $N_1, N_2, N_3, \ldots$ can be obtained with respect to the light emission position (x,y) is represented by the following equation with the values $n_1, n_2, n_3, \ldots$ according to the Poisson statistics:

$$p(n_i, n_2, n_3, \ldots) = \prod_{i=1} f_i(x, y)^{n_i} \exp\{-f_i(x,y)\}/n_i!$$

When the coordinates (x,y) at which the probability $p(n_1, n_2, n_3, \ldots)$ is maximized are obtained from this equation, these coordinates correspond to the maximum likelihood position. Actually, the maximum likelihood position in the unit cell according to the combination of all the values $n_1, n_2, n_3, \ldots$ is calculated in advance to prepare a table. With reference to this table, the maximum likelihood position of the light emission point can be obtained from the PMT outputs with respect to the light emission point. More specifically, a radiation incident position corresponds to a position where the intensity distribution of scintillation light measured by the photodetector in response to radiation incident at an unknown position becomes close to that measured by the photodetector in response to radiation incident at a known position.

The present invention is not limited to the above embodiment, and various changes and modifications can be made. For example, as a scintillator, BGO, $BaF_2$, CsI(T1) ZnS, or the like may be used in place of NaI(T1). In addition, a phototube or a photodiode may be used in place of the PMTs 31 to 35 of the PMT array 30.

As has been described above in detail, according to the scintillation camera of the present invention, the number of output signals used by the detection system is limited by a selector. Therefore, the number of components of the detection system can be decreased to achieve cost reduction.

In addition, a detector array having a plurality of photodetectors each having an anode divided into a plurality of concentric segments is used. For this reason, with a smaller number of PMTs, a resolving power higher than that of the prior art can be obtained. Furthermore, in such a detector array, the segment pitch can be decreased, thereby reducing the width of a change in output (LRF) with respect to the scintillation light emission position. Therefore, a light guide having a lower profile than that of the prior art can be arranged between the scintillator and the detector array, thereby minimizing an optical loss or a distortion in position in the periphery.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 6-086724 (086724/1994) filed on Apr. 25, 1994 is hereby incorporated by reference.

What is claimed is:

1. A photomultiplier having a photocathode for converting light incident thereon into electrons in an envelope, comprising:
   (a) an electron multiplier for multiplying the electrons generated in said photocathode, being located in said envelope and arranged to oppose said photocathode;
   (b) a first anode for collecting some of the electrons multiplied in said electron multiplier, being arranged to oppose said electron multiplier; and
   (c) a second anode for collecting some of the electrons multiplied in said electron multiplier, being arranged between said electron multiplier and said first anode;
   wherein said first anode has a through hole, and said second anode is connected to a pin, said pin extending through the through hole of said first anode.

2. A photomultiplier according to claim 1, wherein said first anode has an annular shape, and said second anode has a circular shape.

3. A photomultiplier according to claim 2, wherein said electron multiplier is a microchannel plate.

4. An apparatus for detecting a radiation incident position, comprising:
   a plurality of photodetector cells, each of said photodetector cells including a plurality of the photomultipliers, each of the photomultipliers having a photocathode for converting light incident thereon into electrons in an envelope and each photomultiplier including:
      an electron multiplier for multiplying the electrons generated in said photocathode, said electron multiplier being located in said envelope and being arranged to oppose said photocathode,
      a first anode for collecting some of the electrons multiplied in said electron multiplier, said first anode having a through hole, having an annular shape and being arranged to oppose said electron multiplier, and
      a second anode for collecting some of the electrons multiplied in said electron multiplier, said second anode having a circular shape, being connected to a pin that extends through said through-hole of said first anode and being arranged between said electron multiplier and said first anode;
   a scintillator arranged to oppose said photomultipliers;
   a first adder group having a plurality of adders, each of said adders being electrically connected to said first and second anodes of each of said photomultipliers;
   a first position calculator for detecting, from signals output from said first adder group, a centroid position of an intensity distribution of the scintillation light generated in response to incidence of the radiation on said scintillator;
   a selector, connected to said first position calculator, for selecting said photodetector cell arranged at a position corresponding to the centroid position; and
   a second position calculator for calculating the radiation incident position on said scintillator from signals from said anodes included in said photodetector cell selected by said selector.

5. An apparatus for detecting a radiation incident position, comprising:
   (a) a scintillator for converting radiation incident thereon at a certain position into fluorescence; and
   (b) a detector array arranged to oppose said scintillator and having a plurality of photodetector cells each having a plurality of photodetectors adjacent to each other, each of said photodetectors having first and second anodes and a cathode arranged to oppose said scintillator, said cathode converting the scintillation light incident thereon into electrons, said first anode of said photodetector collecting some of the electrons generated in said cathode of said photodetector, and said second anode of said photodetector collecting some of the electrons generated in said cathode of said photodetector;
   (c) a first adder group having a plurality of adders, each of said adders being electrically connected to said first and second anodes of said photodetector and adding received signals;
   (d) a first position calculator, electrically connected to said first adder group, for detecting, from signals output from said first adder group, a centroid position of an intensity distribution of the scintillation light generated in response to incidence of the radiation on said scintillator;
   (e) a selector, connected to said first position calculator, for selecting said photodetector cell arranged at a position corresponding to the centroid position; and
   (f) a second position calculator, electrically connected to said plurality of anodes of said detector array, for calculating, from signals from said anodes included in said photodetector cell selected by said selector, the radiation incident position on said scintillator;
   wherein said first and second anodes are concentrically arranged.

6. An apparatus for detecting a radiation incident position, comprising:
   (a) a scintillator for converting radiation incident thereon at a certain position into fluorescence; and
   (b) a detector array arranged to oppose said scintillator and having a plurality of photodetector cells each having a plurality of photodetectors adjacent to each other, each of said photodetectors having first and second anodes and a cathode arranged to oppose said scintillator, said cathode converting the scintillation light incident thereon into electrons, said first anode of said photodetector collecting some of the electrons generated in said cathode of said photodetector, and said second anode of said photodetector collecting some of the electrons generated in said cathode of said photodetector;

(c) a first adder group having a plurality of adders, each of said adders being electrically connected to said first and second anodes of aid photodetector and adding received signals;

(d) a first position calculator, electrically connected to said first adder group, for detecting, from signals output from said first adder group, a centroid position of an intensity distribution of the scintillation light generated in response to incidence of the radiation on said scintillator, wherein said first position calculator has:
  a) an energy discriminator for discriminating an output from a second adder,
  b) an A/D converter for converting an analog signal output from a centroid position calculator into a digital signal, and
  c) a gate circuit, connected to said energy discriminator and said A/D converter, for supplying an output from said A/D converter a said selector when an energy discriminated by said energy discriminator is larger than a predetermined value;

(e) said selector, connected to said first position calculator, for selecting said photodetector cell arranged at a position corresponding to the centroid position; and (f) a second position calculator, electrically connected to said plurality of anodes of said detector array, for calculating, from signals from said anodes included in said photodetector cell selected by said selector, the radiation incident position on said scintillator.

7. An apparatus according to claim 6, wherein said selector selects one photodetector arranged at the position corresponding to the centroid position of a light intensity calculated by said first position calculator and said photodetector cell includes two photodetectors adjacent to said selected photodetector.

8. An apparatus for detecting a radiation incident position, comprising:

(a) a scintillator for converting radiation incident thereon at a certain position into fluorescence; and (b) a detector array arranged to oppose said scintillator and having a plurality of photodetector cells each having a plurality of photodetectors adjacent to each other, each of said photodetectors having first and second anodes and a cathode arranged to oppose said scintillator, said cathode converting the scintillation light incident thereon into electrons, said first anode of said photodetector collecting some of the electrons generated in said cathode of said photodetector, and said second anode of said photodetector collecting some of the electrons generated in said cathode of said photodetector;

(c) a first adder group having a plurality of adders, each of said adders being electrically connected to said first and second anodes of said photodetector and adding received signals;

(d) a first position calculator, electrically connected to said first adder group, for detecting, from signals output from said first adder group, a centroid position of an intensity distribution of the scintillation light generated in response to incidence of the radiation on said scintillator;

(e) a selector, connected to said first position calculator, for selecting said photodetector cell arranged at a position corresponding to the centroid position; and (f) a second position calculator, electrically connected to said plurality of anodes of said detector array, for calculating, from signals from said anodes included in said photodetector cell selected by said selector, the radiation incident position on said scintillator;

wherein said photodetectors are photomultipliers.

9. A device comprising:
a first anode; and
a second anode,
  wherein said first and second anodes are concentrically arranged
  wherein said first and second anodes act as a part of a photodetector, and
  wherein the positions of said first and second anodes are different in the direction of the thickness thereof.

10. A device according to claim 9, wherein said photodetector is a photomultiplier having a photocathode arranged to oppose said first and said second anodes.

11. An apparatus for detecting a radiation incident position, comprising:
a plurality of photodetectors, each of the photodetectors including:
  a first anode;
  a second anode concentrically arranged with respect to said first anode; and
  a photocathode arranged to oppose said first and second anodes.

12. An apparatus according to claim 11, further comprising:
a scintillator arranged to oppose said photomultipliers;
a first position calculator for calculating a centroid position of an intensity distribution of scintillation light generated in response to incidence of the radiation on said scintillator, by using output signals from said first and second anodes;
a selector, connected to said first position calculator, for selecting one of a plurality of photodetector cells arranged at a position corresponding to the centroid position, each of said photodetector cells include at least three neighboring photomultipliers of said photomultipliers; and
a second position calculator for calculating the radiation incident position on said scintillator from signals from said anodes included in said photodetector cell selected by said selector.

13. An apparatus according to claim 12, further comprising a holder having a curved member with fixing holes for fixing said photodetectors inside.

14. An apparatus according to claim 13 further comprising a light guide fixed between said holder and said scintillator.

15. An apparatus according to claim 13, further comprising a light guide fixed between said holder and said scintillator, said holder and said light guide being in contact with each other.

16. A photodetector converting light into electrons comprising:
a first anode; and
a second anode,
  wherein said first and second anodes are concentrically arranged for collecting the electrons, and
  the positions of said first and second anodes are different in the direction of the thickness thereof.

17. An apparatus for detecting a radiation incident position, comprising:

a plurality of photodetector cells, each of said photodetector cells including a plurality of photomultipliers, each of the photomultipliers having a photocathode for converting light incident thereon into electrons in an envelope and each photomultiplier including an electron multiplier, a first anode and a second anode;

a scintillator arranged to oppose said photomultipliers;

a first adder group having a plurality of adders, each of said adders being electrically connected to said first and second anodes of each of said photomultipliers;

a first position calculator for detecting, from signals output from said first adder group, a centroid position of an intensity distribution of the scintillation light generated in response to incidence of the radiation on said scintillator;

a selector, connected to said first position calculator, for selecting said photodetector cell arranged at a position corresponding to the centroid position; and a second position calculator for calculating the radiation incident position on said scintillator from signals from said anodes included in said photodetector cell selected by said selector.

* * * * *